May 30, 1961
R. W. ERLBACHER
2,986,111
MARINE PROPELLER HUB OF SPECIAL GRADUALLY
INCREASING DIAMETER AND COMBINATION
THEREOF WITH A TUBULAR RUDDER
Filed March 11, 1955
3 Sheets-Sheet 1
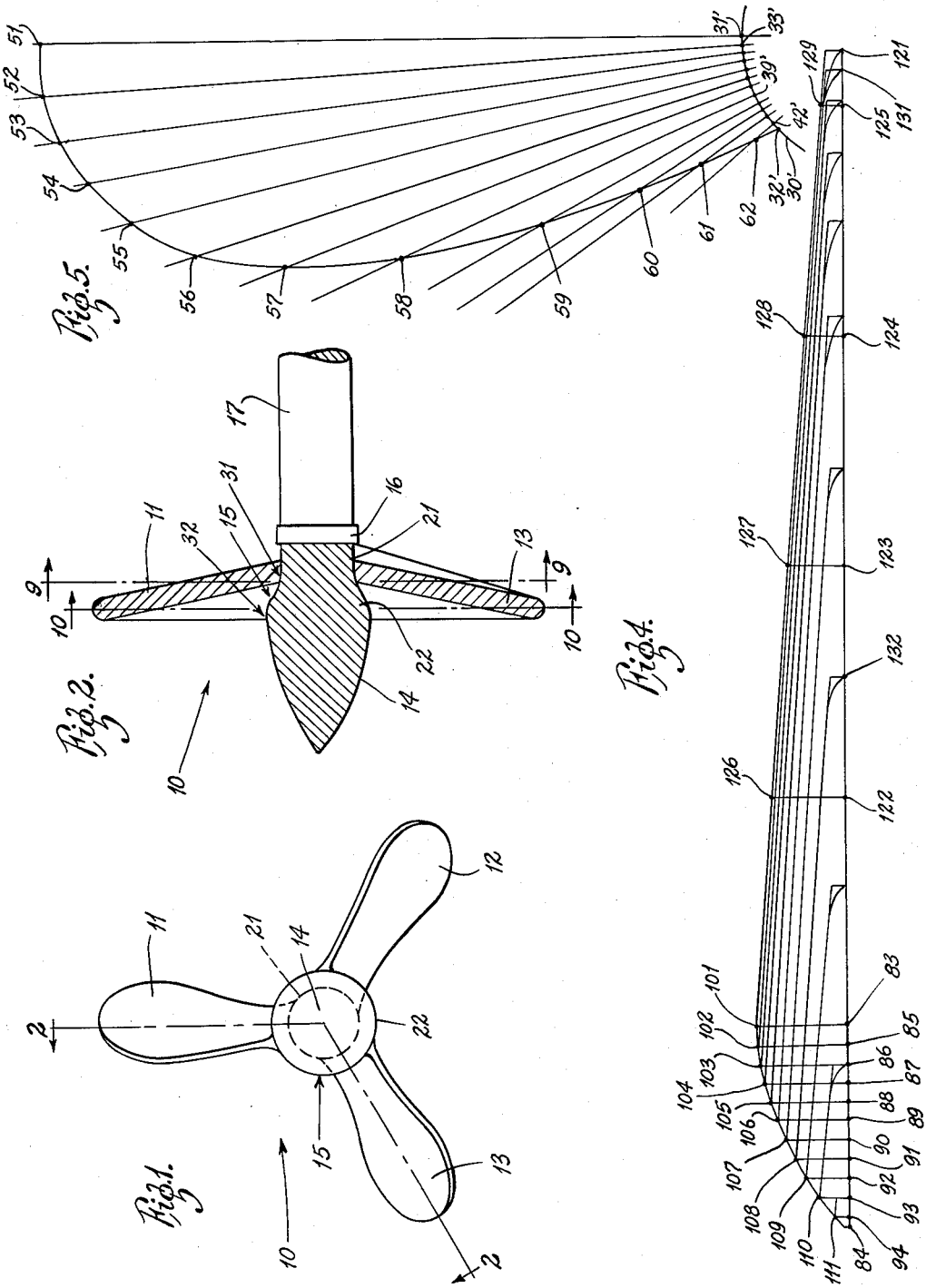
INVENTOR:
ROBERT W. ERLBACHER,
BY Kingsland, Rogers & Ezell
ATTORNEYS

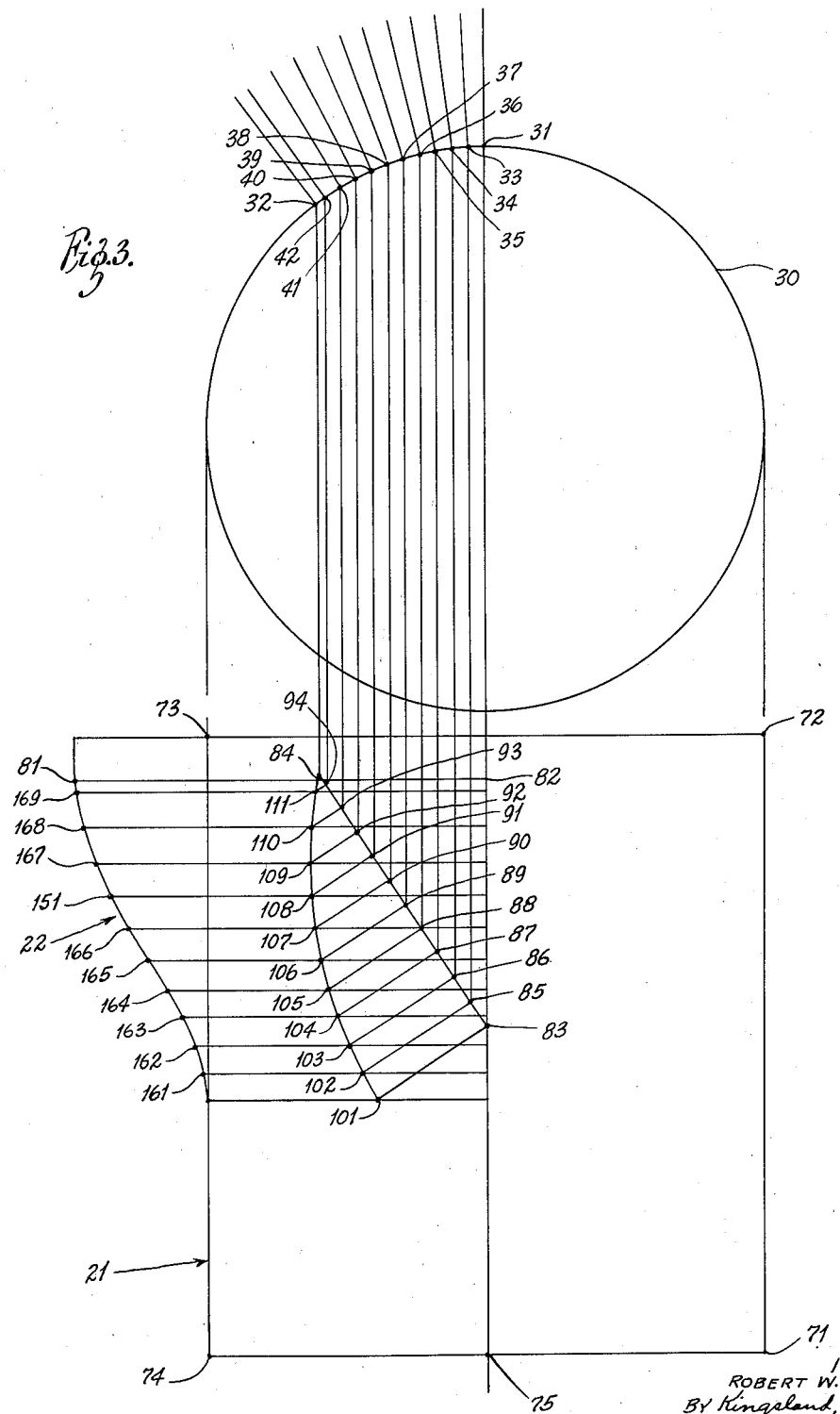

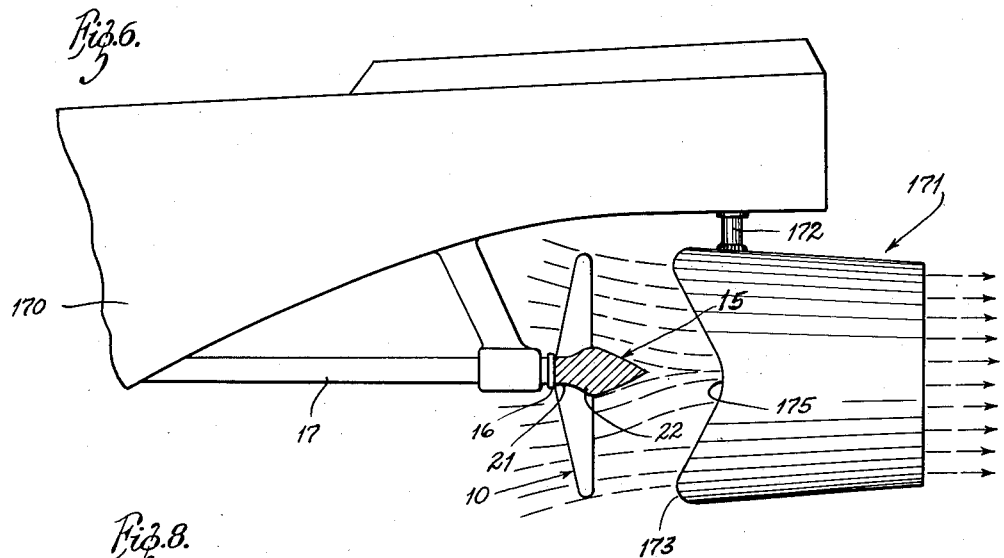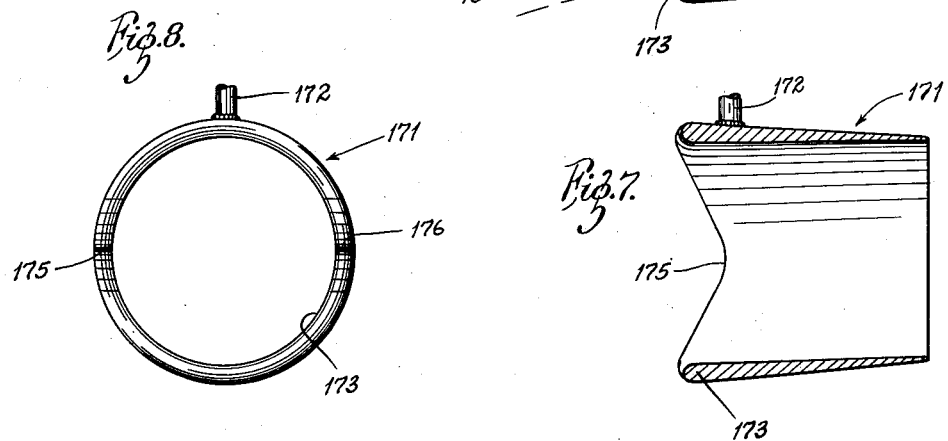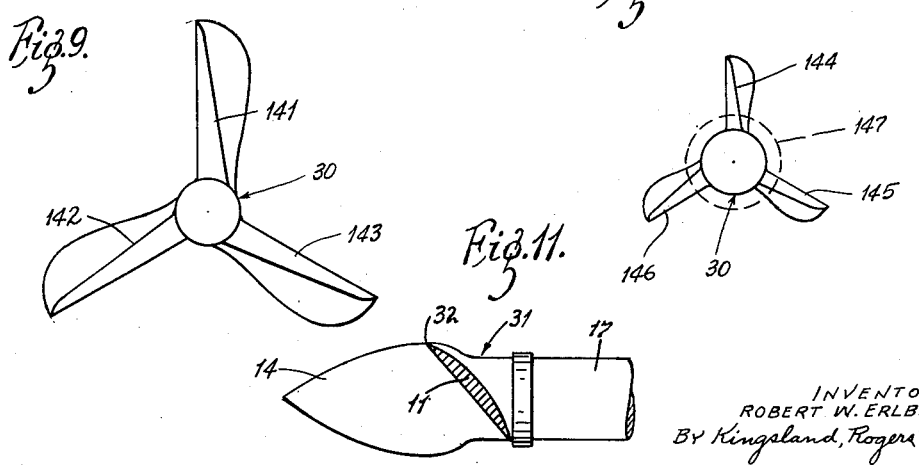

United States Patent Office 2,986,111
Patented May 30, 1961

2,986,111

MARINE PROPELLER HUB OF SPECIAL GRADUALLY INCREASING DIAMETER AND COMBINATION THEREOF WITH A TUBULAR RUDDER

Robert W. Erlbacher, 920 N. Fountain,
Cape Girardeau, Mo.

Filed Mar. 11, 1955, Ser. No. 493,635

7 Claims. (Cl. 114—166)

This invention relates to improvements in propellers, and in particular is concerned with an improved propeller hub which may be employed with a tubular rudder.

It has been found in the past that cavitation is a very serious problem in marine propellers. This phenomenon of cavitation is due to the velocity field in the fluid worked upon by the propeller which causes a pressure drop until it reaches the vapor pressure of the fluid, and is accompanied by a change of some of the fluid into saturated vapor, as a result of which the homogeneity of the flow is distributed. For marine propellers this change gives rise to an increase in the revolutions per minute and reduction of thrust and torque. At the same time, the screw efficiency materially drops so that finally the power may rise considerably for the same ship speed.

Cavitation also causes erosion or wasting of the screw blades and vibration and consequent fracture may result. Thus, the occurrence of cavitation has been a very major problem in the design of propellers for the marine industry.

By means of this invention, there has been provided an improved propeller having a specially designed propeller hub which substantially minimizes the problem of cavitation and its attendant disadvantages. Through the design of a hub which increases in diameter from the thickest part of the blade in an axial direction toward the stern and in inverse proportion to the decreasing thickness of the blade, a built-up barrier is provided which prevents a collapse of the fluid propelled astern of the propeller. As a result of the hub design, the flow lines of the fluid astern of the propeller are evened out and undue turbulence is minimized. The propeller race is consequently made more uniform and more thrust and efficiency from the propeller results.

It has further been found that through the use of the improved propeller hub of this invention, the more uniform propeller race is an added advantage in the employment of a tubular rudder for increased thrust, steering power reduction, maneuverability and lessening of vibration. Thus, the tubular rudder which has been fully disclosed in my copending application entitled "Tubular Rudder," Serial No. 489,586, filed February 21, 1955, now United States Patent No. 2,803,211, can be employed with added advantage.

Accordingly, it is a principal object of this invention to provide a propeller having an improved hub thereon.

Another object of this invention is to provide a propeller having a hub which substantially minimizes cavitation and erosion on the blades of the propeller.

Still a further object of this invention is to provide a propeller having a hub which increases in diameter from the thickest part of the blade axially toward the rear of the propeller in inverse proportion to the thickest part of the blade to the trailing edge of the blade.

Yet another object of this invention is to provide a propeller having an improved hub which varies in thickness to prevent collapse of fluid worked upon by the propeller blade.

Yet a further object of this invention is to provide an improved propeller with a varying hub diameter in combination with a tubular rudder.

Further objects of this invention will appear in the detailed description which follows and will be further apparent to those skilled in the art.

In the accompanying drawings, there is shown for the purpose of illustration a three-bladed propeller and diagrams for determining the thickness of the propeller hub in connection with this propeller. Also, there is shown in combined form the improved propeller and hub of this invention in association with a tubular rudder. It is to be understood that these drawings are for the purpose of example only and that this invention is not limited to the particular forms shown.

In the drawings:

Figure 1 is a plan view of the stern side or rear of the propeller;

Figure 2 is a view in section taken on the line 2—2 of Figure 1 showing the hub in partially broken away section;

Figures 3 through 5 are diagrams showing how the hub diameter is determined in relation to the thickness of the propeller blades;

Figure 6 is a view in side elevation of the rear of a vessel equipped with the propeller hub and tubular rudder of this invention in which the hub is shown in vertical section;

Figure 7 is a view in vertical section taken on the axis of the tubular rudder;

Figure 8 is a view in front elevation of the tubular rudder;

Figure 9 is a sectional view showing the area of the propeller at its thickest part superimposed upon the hub having its smallest diameter at this point;

Figure 10 is a sectional view showing the area of the propeller blade at a point intermediate the thickest part of the blade and its trailing edge superimposed upon the hub at its smallest diameter and showing the hub corresponding to this intermediate point in dotted lines; and Figure 11 is a top plan view of the propeller hub showing the intersection of a propeller blade with the hub in section.

First of all, it will be helpful to have a general consideration of the factors involved in the problem of cavitation. This phenomenon may be explained as being due to the implosion of small bubbles which first appear on the rear or driving side of the blade and where the velocity is at a maximum. Cavitation which erodes the blade face is thought to be caused by the change of the potential energy of the surface tension of the bubbles through the transformation into kinetic energy which, in turn, is destroyed over the small area of impact contracting to a single point. Thus, a blow having a small but finite amount of energy exerted on an infinitely small area, such as in the implosion of a bubble, has a material effect in the damaging of the surface.

As a result of these considerations, it has been found desirable in the past to make the marine propellers of a very smooth surface such as can be obtained by the use of bronze. Other materials such as steel which cannot be so highly polished are, when used in propellers, exceptionally susceptible to cavitation and erosion.

In the occurrence of cavitation there is a disturbance in the flow of fluid past the blade caused by partial collapse of the wheel race due to the pressure reduction resulting from the increased velocity in accordance with the Bernoulli theorem. In order to compensate for this contraction which is known to exist astern of the propeller for the wheel race and to lessen the turbulence, the propeller hub in this invention is increased in diameter from the thickest part of the blade to the rear in inverse proportion to the thickness of the blade. It has also been found to be desirable to use a fairwater at the end of the propeller hub for best results.

Figures 1 and 2 show a propeller having the specially designed propeller hub of this invention and equipped with a fairwater. The propeller generally indicated at 10 consists of three blades 11, 12 and 13. The propeller is equipped with a fairwater extending from the rear of the blades down to a tapered point, and this fairwater is indicated at 14. A hub generally indicated at 15 is fixed to a propeller shaft 17.

The propeller hub is composed of two portions, i.e., a forward portion 21 and a rear portion 22. The forward portion 21 of the hub is of a constant diameter from the thickest part of the blades forward to adjacent the collar 16. However, the rear portion 22 is of an increasing diameter to the rear of the blades where it is then contiguous with the fairwater 14. Thus, the diameter of the propeller hub increases from about the center of the axial length of the hub at the thickest part of the symmetrical blades 11, 12 and 13 to the rear of these blades as they decrease in thickness.

The rear hub portion 22 has been made of an increasing diameter to compensate for the loss in thickness of the propeller blade from its thickest portion to the rear. This prevents a premature collapse of the fluid being worked upon by the propeller blade, and minimizes cavitation with its attendant disadvantages which have been discussed above. The manner in which the hub diameter is increased is determined by the diagrams of Figures 3 through 5, which describe the proportioning of the thicknesses of the propeller blades relative to the hub diameter increase.

Briefly, the hub diameter is increased back of the thickest portion of the blade in such a manner that the total area of the thicknesses of each blade at all positions along the axis of the propeller is, with the addition of the increased area of the built-up hub, made equal to the total area of the thickness of the three blades at their thickest portions. This will be more clear from a description of Figures 9 and 10 which will be discussed more fully below. However, in order to determine the increased diameter of the hub the thickness of the blade at all positions on the axis from the thickest part of the blade to the rear of the hub must first be ascertained.

A procedure for laying out the cross section of the blade at different spaced points along the axis of the propeller from the thickest portion of the blade to the rear is shown in Figures 3 to 5. First of all, as shown at the upper portion of Figure 3, a circle 30 is inscribed which is of a diameter equal to the diameter of the forward hub portion 21. After this has been done, point 31 corresponding to the thickest portion of the blade, as for example blade 11, is marked on the circle 30, and then point 32 is marked corresponding to the thinnest portion or trailing edge of the blade at the rear. Subsequently points 33 through 42 are laid out at equal increments. These latter points are at equal angular dispositions on the arc 31—32.

Next, by reference to Figure 5, it will be seen that the arc 31'—32' with the intermediate located points 33' through 42' have been laid off on a portion of the circle 30'. In Figure 5 there is a different scale than that for Figure 3 which is merely for the purpose of illustration and it is to be understood that the same scale is employed in actual practice for all the diagrams herein. In this next step, the height of the blade along a radial line from the center of circle 30 is determined by actually measuring the height of the blade above the point at its intersection with the hub. Thus, line 31'—51 corresponds to the height of a blade at the thickest portion, while of course the height of a blade at point 32' is shown as being zero since this is the trailing edge. Similar points 52 through 62 represent the height of the blade for points 33' through 42' at the intersection of a blade with the hub along these different positions. This diagram will represent a rear elevation of the after half of the blade from the thickest portion to the trailing edge.

Now returning to Figure 3, the thickness of the base of the blade between points 31 and 32 is determined by laying off a plan section of the naked hub on the same axis as the center of the circle 30. The plan of the hub is represented by the points 71, 72, 73 and 74, with the axis between points 31 and 75. Then a line between points 81 and 82 is laid off perpendicularly to the axis at a point corresponding to the rear of the blade. From point 82 toward point 75 on the axis an increment is laid off terminating at point 83 corresponding to the actual distance along the axis from the thickest part of the hub to the end of the trailing section. Next, a line parallel with the axis 31—75 is drawn from point 32 intersecting the line 81—82 at 84 and base line 83—84 is then drawn.

After this has been done, a series of lines parallel to the axis are laid off from points 33 through 42 to the line 83—84 with the intersection points being designated at 85 through 94, respectively. The measured thicknesses at the different points on the blade at 31 and 33 through 42 are then laid off at points 83 and 85 through 94 perpendicularly to the base line 83—84 terminating at points 101 through 111, respectively. Then parallel lines perpendicular to the axis 31—75 are drawn through each of the points 101 through 111. It is on these lines that the diameter of the hub is increased in proportion to the reduced cross-sectional area of the blades from the thickest portion to the rear, as will further appear below with respect to the discussion of Figures 9 and 10.

Reference will now be had to Figure 4 which shows the procedure for determining the cross-sectional area of each blade at the various points 31 and 33 through 42 to the trailing edge at 32, as shown in Figure 3. First of all, the curve defined by the points 101, 83 and 84 at the bottom in Figure 3 is laid off as shown in Figure 4. Figure 4 is of a different scale than Figure 3, but it is to be understood this is only for the purpose of illustration and that, in the actual diagramming, as previously mentioned, the scale will be the same. After this has been done, the length of the blade at the thickest section, which is taken from points 31'—51 in Figure 5, is laid off at right angles to the base section 101—83 corresponding to the thickness of this section of the blade. This length is defined by points 83 and 121. Then the area of the blade at the point 31 is determined by laying off equal increments along the line 83—121 at the points 122, 123 and 125. The thickness of the blade at point 31 is then measured heightwise on the blade at these increments and laid off at points 126, 127, 128 and 129, and a curve is drawn between these points and the limiting points 101 and 121, as shown in Figure 4. This gives the actual area for the blade which can then be determined mathematically in a known manner.

Next, the cross section for point 33 on the circle 30 for the blade of Figure 3 is determined from the base thickness at points 85 and 102 by laying off a line between point 85 and 131 corresponding to the height of this blade between points 33' and 52 in Figure 5. The area is then determined in the same manner as described above by laying off equal increments along the line 85—131 and measuring the thickness of the blade heightwise at these points.

Similarly, the cross section for points 34 through 42 from Figure 3 are determined and the completed diagram is shown in Figure 4 for all of these cross sections. The above lay-out procedure provides a convenient method for determining the cross-sectional area for the thickness of the blade at different positions from the thickest portion of the blade of the propeller to the trailing edge.

It is readily apparent that the area of the thickest part of the blade at point 31, as defined by the curve 83—101 and 121 in Figure 4, is substantially greater than an intermediate point, as for example at point 39 defined by the curve on Figure 4 at points 91—108—132. As has been previously mentioned, it is desired to make the hub of an increased diameter to compensate for the reduction in area at the points 33 through 42 compared to the thickness of the blade at point 31. This is accomplished by increasing the diameter of the hub in these points so that the total area for the hub portion is increased over and above the area of the naked hub per se defined by the diameter between points 71—74. Thus, the area of the blades and the enlarged hub at each point is equal to the total area of the thickest section of the blades at point 31. The area of the curve 83—101—121 times 3 is, of course, the total area for the thickest portion of the blade, since there are three blades.

Diagrammatically the area of the thickest portion of the three blades is shown at Figure 9 for the three blade sections 141, 142 and 143, each one of which is identical to the curve 83—101—121 for the cross section of the blade at point 31. The circle 30 indicates the hub of constant diameter.

In Figure 10, the cross sections for the blade at point 39, for example, of Figure 3, as defined by the curve 91—108—132 of Figure 4, is indicated by the numerals 144, 145 and 146. Here it is obvious from a comparison with the blades 141, 142 and 143 of Figure 9 that the first-named blades in Figure 10 are of considerably smaller area. To compensate for this, the diameter of the hub is increased from the circle shown at 30 to the circle shown in dotted lines at 147. The diameter of the circle 147 is so calculated in a known manner that the total cross-sectional area of the annulus 30—147 and the blades 144, 145 and 146 in Figure 10 is the same as the blades 141, 142 and 143 in Figure 9.

The radius for the new hub section defined by the circle 147 in Figure 10 is then laid off for the point 39 on the line through point 108 in Figure 3 perpendicular to the axis. The end of this line on the aforementioned radius defines a new point 151.

In a similar manner, for points 33 through 38 and 40, 41 and 42 new radii are laid off through points 102 through 107 and 109 through 111, respectively. These new points, in order, are 161 through 169.

Thus, there has been disclosed in the diagrams 3 through 5 and 9 and 10 a means for determining a hub having a diameter which increases in such a manner so as to present a constant cross section with the blades from the thickest portions thereof to the trailing edges. This hub has been shown at the lower left hand portion of Figure 3, and it is obvious from the above detailed description that any propeller can be provided with the hub of this invention in the same manner as described above.

This hub, since it substantially minimizes cavitation, has been found to be very valuable in the increase of power and elimination of vibration. Also, erosion through cavitation effects is no longer a serious problem. Thrust has been increased in the order to ten percent as has been the speed with a consequent reduction in required r.p.m. All of these factors aid in greater propeller efficiency, less fuel consumption, and lessened power requirements.

It has further been found that the propeller and hub of this invention have markedly increased advantages when used in combination with a tubular rudder particularly described in my copending application Serial No. 489,586, filed February 21, 1955, now United States Patent No. 2,803,211. The use of this propeller hub with the tubular rudder is particularly shown in Figures 6, 7 and 8.

Thus, in Figure 6, a vessel is shown at 170 and the propeller 10 of this invention is shown connected to a propeller shaft 17 and a hub 15, shown in cross section. The tubular rudder is generally indicated at 171 pivoted to a rudder post 172.

The tubular rudder is of a generally cylindrical interior, but may have a curved cross section to conform with the shape of the wheel race, as is more particularly described in my copending application. The walls of the rudder 171 have an interior airfoil design at the front end wall section 173 so as to present an outwardly flaring appearance. Both the port and starboard sides at the front end of the rudder are recessed at 175 and 176 in order to present the greatest possible access when the rudder is pivoted away from the straight forward position.

The interior area of the tubular rudder is designed to conform with the cross-sectional area of the wheel race which contracts to a substantially constant area aft of the propeller at the point where the tubular rudder is positioned.

In the operation of the tubular rudder, the wheel race enters the tubular rudder at the front and is exhausted to the rear end. Full control of the wheel race and steering is effected by pivoting the rudder post 172 in a conventional manner, and as a result the wheel race is exhausted at an angle from the axis of the vessel to effect a very high efficiency for steering maneuverability.

It has been found that through the use of this invention the thrust resulting from the combined use of the propeller of this invention and the tubular rudder is greater than the added effects of either one of the propeller or rudder used by itself. Thus, this combination has a synergistic effect and the thrust realized from the combination of the propeller hub and the tubular rudder has been found to be very high. In actual tests, the thrust of a propeller equipped with the hub of this invention has been found to be ten percent greater than the identical propeller without the hub. Also, in the use of a propeller without the hub of this invention, it has been found that the increased thrust from the employment of the tubular rudder of this invention is about ten percent. The conjoint use of the propeller with the hub of this invention and the tubular rudder has surprisingly been found to be of the order of twenty-five percent showing the synergistic effect of the combination of the two.

It is, however, obvious that the propeller of this invention can be used alone with increased benefits in conventional steering rigs such as the bladed rudders to reduce cavitation. The utility of this propeller is of wide range on all types of marine vessels from large ships down to small boats, since the cavitation problem knows no size limitations as is well known in the art.

It is apparent that various changes and modifications may be made in the propeller and the propeller and rudder combination of this invention. Such changes will be obvious to those skilled in the art and are within the scope of this invention as defined by the claims appended hereto.

What is claimed is:

1. A marine propeller having a plurality of blades, each blade having a varying cross-sectional area which is greatest in a plane normal to the axis of propeller rotation and intermediate the leading and trailing edges of said blades, and means for minimizing cavitation in the fluid passed from the front to the rear of the propeller, said means comprising a hub in which said blades are mounted, said hub having a cross-sectional area which varies inversely to the cross-sectional area of said blades from said plane to said trailing edges, said hub being substantially uniform in cross-sectional area from said plane to the said leading edges.

2. A marine propeller having a plurality of blades, each blade having a varying cross-sectional area which is greatest in a plane normal to the axis of propeller rotation and intermediate the leading and trailing edges of said blades, and means for minimizing cavitation in the fluid passed from the front to the rear of the propeller, said means comprising a hub in which said blades are mounted, said hub having a cross-sectional area which varies inversely to the cross-sectional area of said blades from said plane to said trailing edges, said hub being substantially uniform in cross-sectional area from said plane to the said leading edges, the total cross-sectional area of the blades and the hub from said plane to said trailing edge being substantially equal to the cross-sectional area of the hub and the blades at said plane.

3. A marine propeller having a plurality of blades, each blade having a varying cross-sectional area which is greatest in a plane normal to the axis of propeller rotation and intermediate the leading and trailing edges of said blades, and means for minimizing cavitation in the fluid passed from the front to the rear of the propeller, said means comprising a hub in which said blades are mounted, said hub having a cross-sectional area which varies inversely to the cross-sectional area of said blades from said plane to said trailing edges, said hub being substantially uniform in cross-sectional area from said plane to the said leading edges, the total cross-sectional area of the blades and the hub from said plane to said trailing edge being substantially equal to the cross-sectional area of the hub and the blades at said plane, and a fairwater at the rear end of said hub projecting to the rear of the propeller blades.

4. A marine vessel having in combination a marine propeller having a plurality of blades, each blade having a varying cross-sectional area which is greatest in a plane normal to the axis of propeller rotation and intermediate the leading and trailing edges of said blades, and means for minimizing cavitation in the fluid passed from the front to the rear of the propeller, said means comprising a hub in which said blades are mounted, said hub having a cross-sectional area which varies inversely to the cross-sectional area of said blades from said plane to said trailing edges, said hub being substantially uniform in cross-sectional area from said plane to the said leading edges, and a tubular rudder suppored upon a vertical rudder shaft depending from the vessel, said rudder being spaced from said propeller at the rear thereof, said tubular rudder comprising a substantially cylindrical shell having an open front end to receive the propeller race and an open rear end to exhaust the race therefrom, said shell having an outwardly flaring interior at its front end and a substantially constant cross section for a major portion of its hollow interior to said rear end, said cross section corresponding physically to the cross section of the wheel race which flows therethrough.

5. A marine vessel having in combination a marine propeller having a plurality of blades, each blade having a varying cross-sectional area which is greatest in a plane normal to the axis of propeller rotation and intermediate the leading and trailing edges of said blades, and means for minimizing cavitation in the fluid passed from the front to the rear of the propeller, said means comprising a hub in which said blades are mounted, said hub having a cross-sectional area which varies inversely to the cross-sectional area of said blades from said plane to said trailing edges, said hub being substantially uniform in cross-sectional area from said plane to the said leading edges, the total cross-sectional area of the blades and the hub from said plane to said trailing edge being substantially equal to the cross-sectional area of the hub and the blades at said plane, and a tubular rudder supported upon a vertical rudder shaft depending from the vessel, said rudder being spaced from said propeller at the rear thereof, said tubular rudder comprising a substantially cylindrical shell having an open front end to receive the propeller race and an open rear end to exhaust the race therefrom, said shell having an outwardly flaring interior at its front end and a substantially constant cross section for a major portion of its hollow interior to said rear end, said cross section corresponding physically to the cross section of the wheel race which flows therethrough.

6. A marine vessel having in combination a marine propeller having a plurality of blades, each blade having a varying cross-sectional area which is greatest in a plane normal to the axis of propeller rotation and intermediate the leading and trailing edges of said blades, and means for minimizing cavitation in the fluid passed from the front to the rear of the propeller, said means comprising a hub in which said blades are mounted, said hub having a cross-sectional area which varies inversely to the cross-sectional area of said blades from said plane to said trailing edges, said hub being substantially uniform in cross-sectional area from said plane to the said leading edges, and a fairwater at the rear end of said hub projecting to the rear of the propeller blades, a tubular rudder supported upon a vertical rudder shaft depending from the vessel, said rudder being spaced from said propeller at the rear thereof, said tubular rudder comprising a substantially cylindrical shell having an open front end to receive the propeller race and an open rear end to exhaust the race therefrom, said shell having an outwardly flaring interior at its front end and a substantially constant cross section for a major portion of its hollow interior to said rear end, said cross section corresponding physically to the cross section of the wheel race which flows therethrough, and pivot means for pivoting the rudder about the axis of the rudder shaft in different directions to exhaust the race at a direction away from the axis of the vessel to effect steering control.

7. A marine vessel having in combination a marine propeller having a plurality of blades, each blade having a varying cross-sectional area which is greatest in a plane normal to the axis of propeller rotation and intermediate the leading and trailing edges of said blades, and means for minimizing cavitation in the fluid passed from the front to the rear of the propeller, said means comprising a hub in which said blades are mounted, said hub having a cross-sectional area which varies inversely to the cross-sectional area of said blades from said plane to said trailing edges, said hub being substantially uniform in cross-sectional area from said plane to the said leading edges, and a fairwater at the rear end of said hub projecting to the rear of the propeller blades, a tubular rudder supported upon a vertical rudder shaft depending from the vessel, said rudder being spaced from said propeller at the rear thereof, said tubular rudder comprising a substantially cylindrical shell having an open front end to receive the propeller race and an open rear end to exhaust the race therefrom, said shell having an outwardly flaring interior at its front end and a substantially constant cross section for a major portion of its hollow interior to said rear end, said cross section corresponding physically to the cross section of the wheel race which flows therethrough, and pivot means for pivoting the rudder about the axis of the rudder shaft in different directions to exhaust the race at a direction away from the axis of the vessel to effect steering control, said shell having its leading front edges recessed at the sides to the rear of the top front edge to provide for greater access of the propeller race when the rudder is pivoted.

References Cited in the file of this patent

UNITED STATES PATENTS

| | | |
|---|---|---|
| 934,633 | Scott | Sept. 21, 1909 |
| 1,023,584 | Muhlberg | Apr. 16, 1912 |
| 2,139,594 | Kort | Dec. 6, 1938 |
| 2,601,837 | Dean | July 1, 1952 |
| 2,803,211 | Erlbacher | Aug. 20, 1957 |